(12) United States Patent
Sorrentino

(10) Patent No.: US 10,039,119 B2
(45) Date of Patent: Jul. 31, 2018

(54) DEVICES AND METHODS FOR D2D TRANSMISSION

(71) Applicant: Telefonaktiebolaget LM Ericsson (publ), Stockholm (SE)

(72) Inventor: Stefano Sorrentino, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 14/772,567

(22) PCT Filed: May 25, 2015

(86) PCT No.: PCT/SE2015/050597
§ 371 (c)(1),
(2) Date: Sep. 3, 2015

(87) PCT Pub. No.: WO2015/178851
PCT Pub. Date: Nov. 26, 2015

(65) Prior Publication Data
US 2016/0302215 A1    Oct. 13, 2016

Related U.S. Application Data

(60) Provisional application No. 62/002,592, filed on May 23, 2014.

(51) Int. Cl.
*H04W 72/10* (2009.01)
*H04W 76/14* (2018.01)
(Continued)

(52) U.S. Cl.
CPC .......... *H04W 72/10* (2013.01); *H04W 4/005* (2013.01); *H04W 4/70* (2018.02); *H04W 72/02* (2013.01);
(Continued)

(58) Field of Classification Search
CPC ....... H04W 72/10; H04W 72/02; H04W 4/00; H04W 74/08; H04W 76/02
See application file for complete search history.

(56) References Cited

U.S. PATENT DOCUMENTS

2013/0114531 A1*  5/2013  Ahn .................. H04W 72/04
                                            370/329
2014/0128116 A1   5/2014  Lim et al.
(Continued)

FOREIGN PATENT DOCUMENTS

WO      2015143170 A1    9/2015
WO      2015171066 A1   11/2015

OTHER PUBLICATIONS

Seo Daewon, Jun. 20, 2012, Periodic Data Transmission for D2D, U.S. Appl. No. 61/661,814, pp. 1-21.*
(Continued)

*Primary Examiner* — Lakeram Jangbahadur
(74) *Attorney, Agent, or Firm* — Christopher & Weisberg, P.A.

(57) ABSTRACT

A method performed by a first device, for sending data in a Device-to-Device, D2D, transmission to a second device is provided. After the first device has identified a priority level of the D2D transmission, it maps the identified priority level to a resource pool index. The resource pool index identifies a resource pool among a plurality of resource pools associated with different priority levels. The first device then sends the data in the D2D transmission to the second device, using the resources in the resource pool identified by the resource pool index.

21 Claims, 10 Drawing Sheets

(51) Int. Cl.
| | |
|---|---|
| *H04W 4/70* | (2018.01) |
| *H04W 72/02* | (2009.01) |
| *H04W 74/08* | (2009.01) |
| *H04W 76/02* | (2009.01) |
| *H04W 4/00* | (2018.01) |

(52) U.S. Cl.
CPC ..... *H04W 74/0808* (2013.01); *H04W 76/023* (2013.01); *H04W 76/14* (2018.02)

(56) References Cited

U.S. PATENT DOCUMENTS

| | | | | |
|---|---|---|---|---|
| 2015/0173048 | A1* | 6/2015 | Seo | H04W 72/1247 370/329 |
| 2015/0271861 | A1* | 9/2015 | Li | H04W 76/023 455/426.1 |
| 2015/0327311 | A1* | 11/2015 | Wei | H04L 12/6418 370/329 |
| 2016/0044724 | A1* | 2/2016 | Seo | H04W 74/0833 370/329 |

OTHER PUBLICATIONS

Seo Hanbyul, Oct. 10, 2013, Method of Allocating Resources for Device-to-Device communication links, U.S. Appl. No. 61/902,273, pp. 1-40.*
3GPP TSG RAN WG1, Apr. 4, 2014, Mode 2 resource allocation for D2D broadcast communication, R1-141306, p. 1-6.*
Seo; Daewon, Periodic Data Transmission for D2D, U.S. Appl. No. 61/661,814, pp. 1-21.*
Li U.S. Appl. No. 61/968,860 (see above US Published document), Mar. 21, 2014, p. 1-43.*
International Search Report and Written Opinion dated Oct. 8, 2015 for International Application Serial No. PCT/SE2015/050597, International Filing Date: May 25, 2015 consisting of 13-pages.
3GPP TSG RAN WG1 Meeting #76bis, R1-141306, Shenzen, P.R. China; Source: Samsung, Title: "Mode 2 Resource Allocation for D2D Broadcast Communication", Agenda Item 7.2.7.2.1, Document and Discussion, 3rd Generation Partnership Project (3GPP), Mobile Competence Centre; 650, Route Des Lucioles; F-06921 Sophia-Antipolis Cedex; France, Mar. 31 through Apr. 4, 2014 consisting of 6-pages.
3GPP TSG RAN WG2 Meeting #88, R2-145204, San Francisco, CA USA; Source: InterDigital Communications, Title: "Multiple Transmission Pools for ProSe Communications", Agenda Item 7.3.2.1, Document for Discussion, Decision, 3rd Generation Partnership Project (3GPP), Mobile Competence Centre; 650, Route Des Lucioles; F-06921 Sophia-Antipolis Cedex; France, Nov. 17-21, 2014 consisting of 3-pages.
3GPP TSG RAN WG2 Meeting #88, R2-145078, San Francisco, CA USA; Source: ILG Electronics Inc., Title: "Resource Pool Selection with Group Priority", Agenda Item 7.3.2.1, Document for Discussion, 3rd Generation Partnership Project (3GPP), Mobile Competence Centre; 650, Route Des Lucioles; F-06921 Sophia-Antipolis Cedex; France, Nov. 17-21, 2014 consisting of 2-pages.
3GPP TSG RAN WG1 Meeting #80bis, R1-151727, Belgrade, Serbia; Source: ZTE, Title: "Discussions on D2D Priority of Different Groups", Agenda Item 7.2.3.2.2, Document for Discussion, 3rd Generation Partnership Project (3GPP), Mobile Competence Centre; 650, Route Des Lucioles; F-06921 Sophia-Antipolis Cedex; France, Apr. 20-24, 2015 consisting of 3-pages.
European Search Report dated Feb. 27, 2017 for EP Regional Phase Application No. 1 579 5567.5-1853, Regional Phase Entry Date: Oct. 12, 2016 consisting of 4-pages.
Si Wen, et al., Title: "QoS-Aware Mode Selection and Resource Allocation Scheme for Device-to-Device (D2D) Communication in Cellular Networks" Published in: 2013 IEEE International Conference on Communications Workshops (ICC), XP32518499A, Jun. 9-13, 2013 consisting of 5-pages.

* cited by examiner

DEVICES AND METHODS FOR D2D TRANSMISSION

TECHNICAL FIELD

Embodiments herein relate to a first device, a second device and methods therein. In particular they relate to relates to receiving and sending data in a Device-to-Device (D2D) transmission.

BACKGROUND

Wireless devices or terminals for communication are also known as e.g. User Equipments (UE), mobile terminals, wireless terminals and/or mobile stations. Wireless devices are enabled to communicate wirelessly in a cellular communications network or wireless communication system, sometimes also referred to as a cellular radio system or cellular networks. The communication may be performed e.g. between two wireless devices, between a wireless device and a regular telephone and/or between a wireless device and a server, such as server providing video streaming service, via a Radio Access Network (RAN) and possibly one or more core networks, comprised within the cellular communications network.

Wireless devices may further be referred to as mobile telephones, cellular telephones, computers, or surf plates with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another wireless device or a server.

A cellular communications network covers a geographical area which is divided into cell areas, wherein each cell area is served by a base station, e.g. a Radio Base Station (RBS), which sometimes may be referred to as e.g. eNodeB (eNB), NodeB, B node, Base Transceiver Station (BTS), or AP (Access Point), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the wireless devices within range of the base stations. The base stations and wireless devices involved in communication may also be referred to as transmitter-receiver pairs, where the respective transmitter and receiver in a pair may refer to a base station or a wireless device, depending on the direction of the communication. Two wireless devices involved in D2D communication may also be referred to as a transmitter-receiver pair. In the context of this disclosure, the expression Downlink (DL) is used for the transmission path from the base station to a wireless device. The expression Uplink (UL) is used for the transmission path in the opposite direction i.e. from the wireless device to the base station.

Universal Mobile Telecommunications System (UMTS) is a third generation mobile communication system, which evolved from the GSM, and is intended to provide improved mobile communication services based on Wideband Code Division Multiple Access (WCDMA) technology. UMTS Terrestrial Radio Access Network (UTRAN) is essentially a radio access network using wideband code division multiple access for communication with terminals. The 3GPP has undertaken to evolve further the UTRAN and GSM based radio access network technologies.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE is controlled by the radio base station.

D2D communication is a well-known and widely used component of many existing wireless technologies, including ad hoc and cellular networks. Examples include Bluetooth and several variants of the IEEE 802.11 standards suite such as WiFi Direct. These systems typically operate in unlicensed spectrum.

Recently, D2D communications as an underlay to cellular networks have been proposed as a means to take advantage of the proximity of communicating devices and at the same time to allow devices to operate in a controlled interference environment. Typically, it is suggested that such D2D communication shares the same spectrum as the cellular system, for example by reserving some of the cellular uplink resources for device-to-device purposes. Allocating dedicated spectrum for D2D purposes is a less likely alternative as spectrum is a scarce resource and dynamic sharing between the D2D services and cellular services is more flexible and provides higher spectrum efficiency.

A transmission mode when sending data during D2D communication may e.g. be unicast wherein a specific UE is the receiver, multicast which also may be denoted groupcast wherein a group of UEs are receivers, and/or broadcast wherein all UEs are receivers.

With connectionless D2D communication, data can be sent from one device to another device without prior arrangement, thereby reducing overhead and increasing communication capacity which is crucial in emergency situations. The source device transmits data to one other device in unicast, or more than one other devices, in multicast, groupcast, or broadcast, without first ensuring that the recipients are available and ready to receive the data. Connectionless communication may be used for one-to-one or one-to-many communication, but it is particularly effective for multicast and broadcast transmissions and thus well-suited for broadcast and group communication The connectionless communication may be realized, e.g., via Physical layer (PHY) unicast transmissions, multicast transmissions, groupcast transmissions or broadcast transmissions. With PHY broadcast transmissions, the transmissions may still be turned into unicast, groupcast, and/or multicast transmissions at higher layers. For example, in the Media Access Control (MAC) layer, multicast or even unicast addresses may be used. Or, alternatively, if using broadcast on both PHY and MAC, multicast or unicast Internet Protocol (IP addresses may be used at the IP layer.

In the seven-layer Open Systems Interconnection (OSI) model of computer networking, the PHY also referred to as layer 1 is the first i.e. lowest layer. The physical layer comprises basic networking hardware transmission technologies of a network. In the seven-layer OSI model of computer networking, MAC data communication protocol is a sublayer of the data link layer, also referred to as layer 2. The MAC sublayer provides addressing and channel access control mechanisms that make it possible for several terminals or network nodes to communicate within a multiple access network that incorporates a shared medium.

One way to efficiently support D2D communication is to use a Scheduling Assignment (SA) followed by data transmission. As a prerequisite, the transmitter and receiver need to be configured with e.g., resource pool information such as time and frequency configuration, to be used for data transmission. When the transmitter needs to transmit data to the receiver it typically first sends a synchronization signal, which is later used as a time reference by the receiver. The next step is to transmit a scheduling assignment, followed by the actual data. It should be noted that the term transmitter refers to a transmitting device and the term receiver refers to a receiving device in the text herein.

SAs are control messages used for scheduling of D2D communication between devices. SAs are transmitted by a device such as a UE that intends to transmit D2D data and they are received by devices such as UEs that are potentially interested in such data. The SAs are transmitted on dedicated resources characterized by time and frequency, and is typically a sparse resource. SAs provide useful information that can be used by the receiver, e.g., to correctly decode a D2D data transmission associated to the SA, such as the resources for data transmission, the modulation and/or coding parameters, timing information, identities for the transmitter and/or receiver, etc. Typically, but not necessarily, SAs are transmitted prior to the actual data transmission, so that a receiver is able to selectively receive data based on the content of the SAs. The data transmissions scheduled by a SA are referred to as a transmission pattern.

By monitoring identities carried in the SA, Discontinuous Reception (DRX) is enabled in the receiver. For example, for multicast D2D communication, the identity in the SA identifies the multicast group. Thus a device such as a UE which is interested in receiving data of one or several multicast groups only need to check the SAs for the corresponding identities. When the UE receives an SA with an identity which corresponds to one of the multicast groups the UE is interested in, the UE may decode the data pointed out by the other information carried in the SA.

A method for providing redundancy in the scheduling assignments is known. For example, the same content may be transmitted by multiple SAs, and the transmitter may transmit only a subset of the redundant SAs, based on autonomous decisions or based on predefined patterns. This is to allow the receiver to periodically monitor the SA resources.

For SA, data and discovery transmission the transmitting UEs may need to select the transmission resources autonomously from a pool of available resources. The pool of available resources is shared by multiple potential transmitters that access it in a contention fashion. Different options are possible for the access algorithm including, e.g., random resource selection within the pool, energy-sensing, collision avoidance protocols, etc. It may be assumed that all UEs implement the same resource access algorithm.

The SAs and communication data for D2D are each transmitted on a common, shared resource pool which may be a common scarce resource pool, e.g. in time and/or frequency, as shown in FIG. 1. UE-A, UE-B and UE-C in FIG. 1 are transmitters. A UE may select the resource(s) to transmit the SAs and data using some rules or protocols. In case of high amount of traffic, these resource pools may become full and collisions may occur.

SUMMARY

It is therefore an object of embodiments herein to provide an improved way of handling D2D transmissions in a in a wireless communications network.

According to a first aspect of embodiments herein, the object is achieved by a method performed by a first device, for sending data in a Device-to-Device, D2D, transmission to a second device. After the first device has identified a priority level of the D2D transmission, it maps the identified priority level to a resource pool index. The resource pool index identifies a resource pool among a plurality of resource pools associated with different priority levels. The first device then sends the data in the D2D transmission to the second device, using the resources in the resource pool identified by the resource pool index.

According to a second aspect of embodiments herein, the object is achieved by a method performed by a second device, for receiving data in a Device-to-Device, D2D, transmission from a first device. The second device receives the data in the D2D transmission from the first device, by using resources in a resource pool identified by a resource pool index. A priority level of the D2D transmission is mapped to the resource pool index, which resource pool index identifies a resource pool among a plurality of resource pools associated with different priority levels.

According to a third aspect of embodiments herein, the object is achieved by a first device for sending data in a Device-to-Device, D2D, transmission to a second device. The first device comprises a processor configured to identify a priority level of the D2D transmission and map the identified priority level to a resource pool index. The resource pool index identifies a resource pool among a plurality of resource pools associated with different priority levels. The processor is further configured to send the data in the D2D transmission to the second device, using the resources in the resource pool identified by the resource pool index.

According to a forth aspect of embodiments herein, the object is achieved by a second device, for receiving data in a Device-to-Device, D2D, transmission from a first device. The second device comprises a processor configured to receive the data in the D2D transmission from the first device, using resources in a resource pool identified by a resource pool index. The priority level of the D2D transmission is mapped to the resource pool index. The resource pool index identifies a resource pool among a plurality of resource pools associated with different priority levels.

An advantage with embodiments herein is that they provide a way to manage different priorities between contention based transmissions without the need to modify the existing UE resource allocation procedure for selecting resources within a resource pool.

BRIEF DESCRIPTION OF THE DRAWINGS

A more complete understanding of the present invention, and the attendant advantages and features thereof, will be provided by the following detailed description when considered in conjunction with the accompanying drawings wherein.

DETAILED DESCRIPTION

Figure 1:
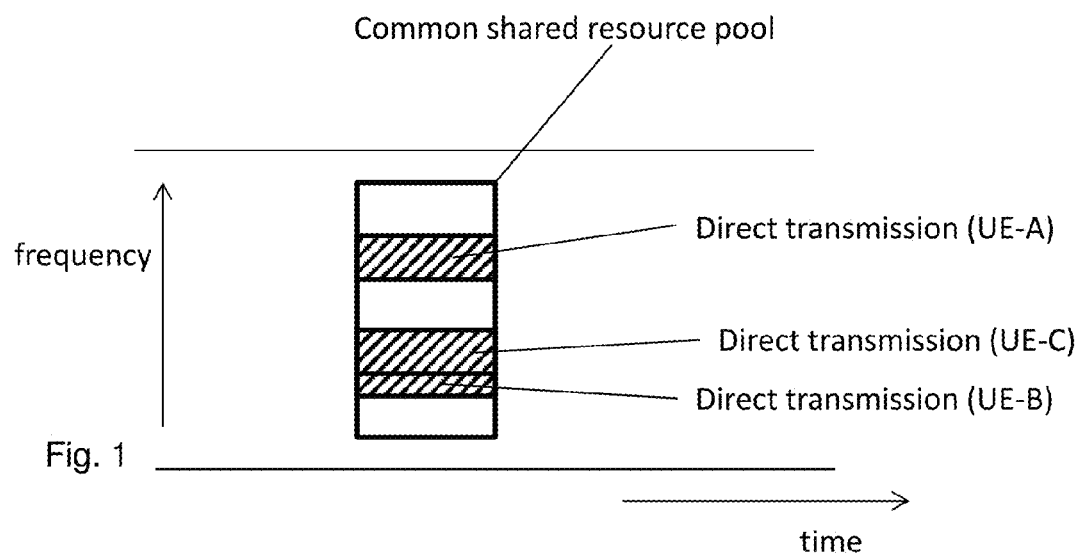
FIG. 1 is a diagram of a known common shared resource pool.

As mentioned above regarding prior art, a device such as a UE may select the resource(s) to transmit SAs and data using some rules or protocols. In case of high amount of traffic, these resource pools may become full and collisions may occur. In such a case there is currently no way to prioritize between devices such as UEs.

Before describing in detail example embodiments that are in accordance with the present disclosure, it is noted that the embodiments reside primarily in combinations of apparatus components and processing steps related to resource pooling in a device-to-device communication system. Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Figure 2:
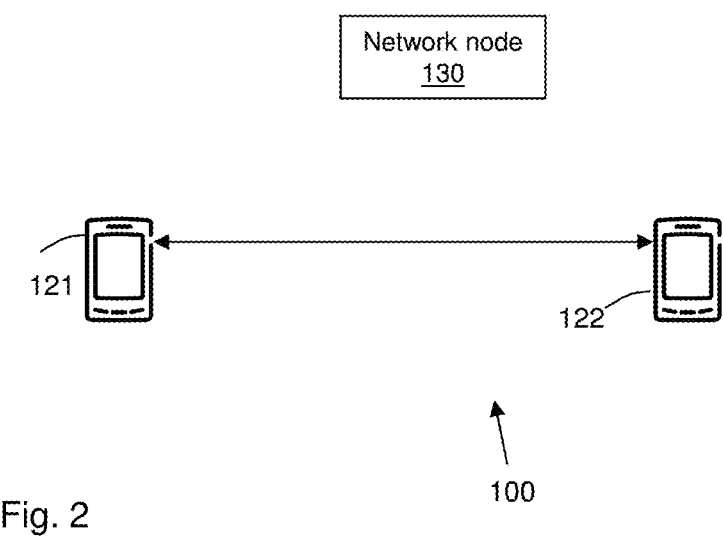
FIG. 2 is a schematic block diagram illustrating a wireless communications network.

FIG. 2 depicts a communications network 100 in which embodiments herein may be implemented. The wireless communications network 100 is a radio network such as a GSM, LTE, a WCDMA, Fifth Generation (5G), a Wimax, or any cellular network or system. The wireless communications network 100 e.g. comprises a core network and a radio access network.

A number of devices operate in the communications network 100. In the example scenario of FIG. 2, only two devices are shown for simplicity, a first device 121 and a second device 122 either or both of which may in some embodiments be served by a network node 130. The first device 121 and the second device 122, may e.g. each be a user equipment, a mobile wireless terminal, a mobile phone, a computer such as e.g. a laptop, or tablet computer, sometimes referred to as a surf plate, with wireless capabilities, or any other radio unit or device capable to communicate over a radio link in a wireless communications network. Further, the first device 121 and the second device 122 are capable of communicating with each other and other devices using D2D communication. Please note the term device used in this document also covers wireless devices such as Machine to Machine (M2M) devices. It should further be noted that the term transmitter further refers to a transmitting device such as the first device 121 and the term receiver further refers to a receiving device such as the second device 122 in the text herein. The network node 130 may e.g. be a base station, such as a eNB, eNodeB, NodeB, B node, or BTS (Base Transceiver Station), or any other network node.

Embodiments herein provide a way to manage different priorities between contention based transmissions without the need to modify the existing UE resource allocation procedure for selecting resources within a pattern. Additionally, embodiments herein allow managing different releases of D2D UEs or devices within a certain network.

Some embodiments rely on the assumption that multiple resource pools are defined for a certain D2D-capable network. The multiple pools may be configured by the network in any way or pre-configured in the devices and/or in the network. The multiple pools may possibly be at least partly overlapping. The pools typically comprise time and/or frequency resources. D2D-capable UEs or devices such as the first device 121 may select resources for transmission within a pool for transmission of a certain D2D signal and/or channel. Possibly, different pools may be created for SA transmission, data transmission, discovery messages transmission, reference signals transmission, including synchronization signals, etc. Possibly, resource pools for data transmission could be transmission-mode specific pools. For each pool type, multiple pools may be defined.

The communication system 100 provides multiple resource pools wherein each resource pool comprises resources. Each respective resource pool is related to a priority level according to a resource pool index. For example, different pools such as the plurality of resource pools may be allocated for a certain transmission type, e.g., an SA resource pool, a mode-2 data resource pool, a mode-2 SAs resource pool, a type-1 discovery resource pool, etc., wherein the pools of different transmission types are associated to different indexes, or distinguishable in any other way.

For example, a first mode-2 data resource pool has index 1 and a second mode-2 data resource pool configured in the same network, e.g., by the same eNB, has index 2. The indexes may be assigned and/or signaled by the network, e.g. by the network node 130, or they may be pre-configured in the devices. The indexes may be mapped to different priority levels for the D2D transmissions.

In some embodiments, the plurality of resource pools may include an SA resource pool, a mode-2 data resource pool, a mode-2 SA resource pool and/or a type-1 discovery resource pool.

For SA, data and discovery the transmitting UEs may need to select the transmission resources autonomously from a pool of available resources. In some embodiments as mentioned above, the different resource pools include a scheduling assignment, SA, resource pool, a mode-2 data resource pool, a mode 2 SA resource pool and a type-1 discovery resource pool.

The "mode-2" and "type-1" terms relate to the way resources are assigned to a UE such as the first and second devices 121, 122, for communications and discovery, respectively. For communication of data and control signaling, such as SA, mode-2 means that transmission resources are selected autonomously by the device such as the first and second devices 121, 122, from a pool of resources. For discovery signaling, type-1 means that transmission resources are selected autonomously by the device, such as the first and second devices 121, 122, from a pool of resources. Correspondingly, for communication of data and control signaling, such as SA, mode-1 means that transmission resources are assigned by the base station such as the network node 130, and for discovery signaling, type-2 means that transmission resources are assigned by the base station.

The mode-2 data resource pool may for example be a resource pool as referred to in 3GPP TS 36.213 v 12.5.0 sections 14.1 and 14.1.3 where a UE procedure for determining resource block pool and subframe pool for sidelink transmission mode 2 is specified.

The mode-2 SA resource pool may for example be a resource pool as referred to in 3GPP TS 36.213 v 12.5.0 sections 14.2 and 14.2.3 where a UE procedure for determining resource block pool and subframe pool for Physical Sidelink Control Channel (PSCCH) related procedures is specified.

The type-1 discovery resource pool may for example be a resource pool as referred to in 3GPP TS 36.213 v 12.5.0 sections 14.3 and 14.3.3 where a UE procedure for determining resource block pool and subframe pool for sidelink discovery is specified.

Figure 3:
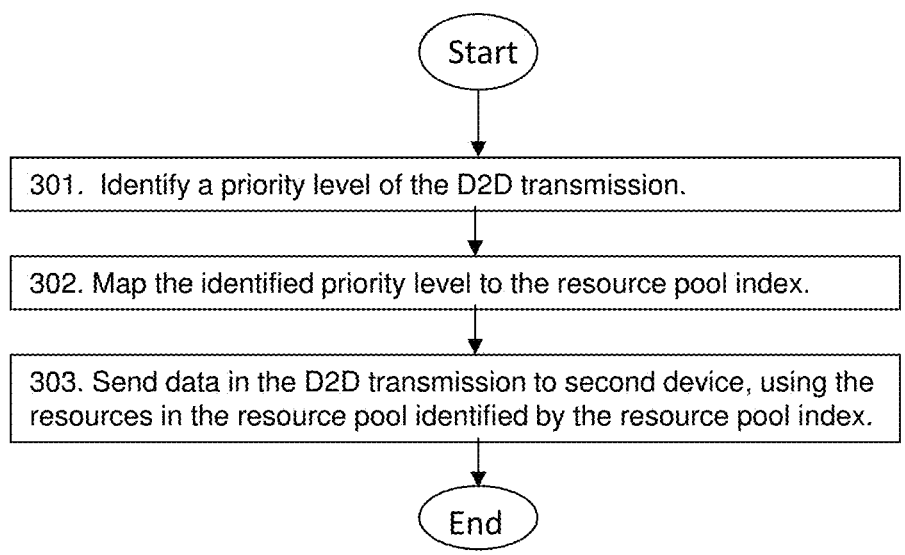
FIG. 3 is a flowchart depicting embodiments of a method in a first device.

Example embodiments of a method performed by the first device 121, for sending data in a D2D transmission to the second device 122 will now be described with reference to a flowchart depicted in FIG. 3.

The method comprises the following actions, which actions may be taken in any suitable order. In an example scenario, the first device 121 has data to transmit to the second device 122 using D2D.

Action 301

To be able to select the correct or appropriate resource pool for a certain D2D transmission, the first device 121 needs to check a priority level of the upcoming D2D transmission. Thus the first device 121 identifies a priority level of the D2D transmission. This may be performed based on mapping between characteristics of the D2D transmission and the priority level. The mapping may be provided by the network, pre-stored in the first device 121 or obtained from the application generating the D2D transmission.

The priority level may be a function of different characteristics of the D2D transmission, which will be shortly discussed here and described more in detail further below.

Action 302

When the first device 121 has identified the priority level, it needs to find a resource pool, among the multiple resource pools, that is suitable for the D2D transmission. Thus the first device 121 maps the identified priority level to a resource pool index. The resource pool index identifies a resource pool among a plurality of resource pools associated with different priority levels. This means that the first wireless device 121 finds the relevant resource pool by selecting the resource pool associated with the resource pool index that the identified priority level maps to.

The priority level may e.g. be a function of characteristics of the D2D transmission, which characteristics comprise at least one of: a type of communication, a type of device such as e.g. the type of the first device 121 and/or the type of the second device 122, and a type of resource allocation.

The type of communication that affects priority level may be one or more of: an emergency type of communication, a commercial type of communication, a unicast type of communication, a multi-cast type of communication and a broadcast type of communication.

The type of resource allocation that affects the priority level may be one or more of: random resource selection, Carrier Sense Multiple Access (CSMA)-based resource selection, energy-sensing based resource selection and contention-resolution based resource selection.

The type of device may be one of different respective device releases of a Third Generation Partnership Project (3GPP) standard, such as LTE and LTE Proximity Services-related Services and Capabilities, and different resource pools out of the plurality of resource pools may be associated with the different respective device releases of the 3GPP standard, such as LTE and LTE Proximity Services-related Services and Capabilities, and associated with different respective resource pool indexes.

In some embodiments, the type of device may be the type of the transmitting device, e.g. the first device 121. It is however also conceivable that the characteristics of the D2D transmission also comprises the type of the receiving device, e.g. the second device 122.

The priority level may further be a function of other characteristics of the D2D transmission, which characteristics may comprise at least one of: a destination address of the D2D transmission, and properties of the destination address of the D2D transmission. Additionally or alternatively, the priority level may be application-based, i.e. it may be a function of the type of application generating the D2D transmission. In some embodiments, the application-based priority level may be assigned by the user.

In some embodiments the priority level may be a function of the transmission type such that different resource pools out of the plurality of resource pools are associated with different respective transmission types and associated with different respective resource pool indexes. Examples of transmission types are: SA, mode-2 data transmission, mode-2 SAs, type-1 discovery transmission/signals, all suggested having specific resource pools above. These transmission types are used for forward/reverse link D2D transmission and further described in 3GPP TS 36.213.

The plurality of resource pools may e.g. include an SA resource pool, a mode-2 data resource pool, a mode-2 SA resource pool and/or a type-1 discovery resource pool.

Information about resource pool indexes identifying each respective resource pool comprised in the plurality of resource pools associated with different priority levels may be signaled to the first device 121 from the network node 130 or they may be pre-configured in the first device 121.

Action 303

The first wireless device 121 has found the relevant resource pool to use for the D2D transmission, by selecting the resource pool associated with the resource pool index according to Action 302. The first device 121 then sends or transmits the data in the D2D transmission to the second device 122, using the resources in the resource pool identified by the resource pool index. For example, the first device 121 may send or transmit the data in the D2D transmission to the second device 122 using the resources in the resource pool identified by the resource pool index.

Figure 4:
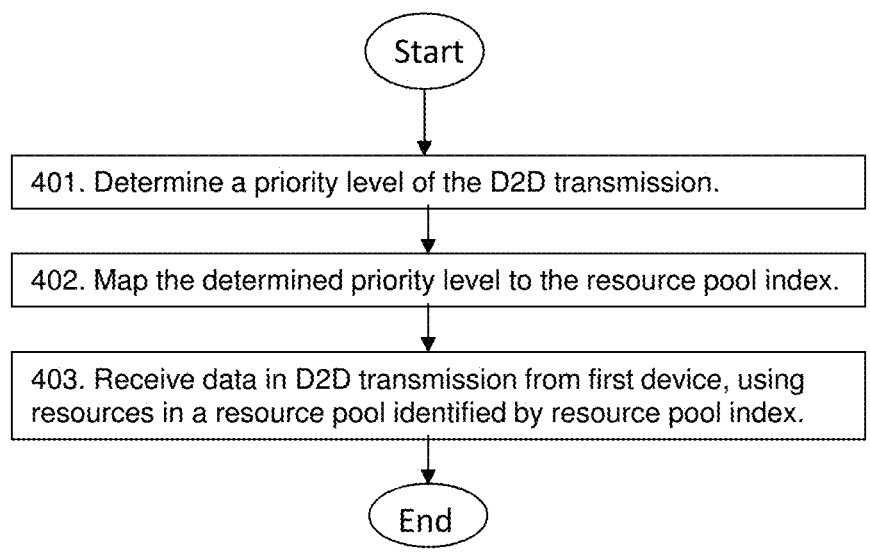
FIG. 4 is a flowchart depicting embodiments of a method in a second device.

The embodiments below describe what happens at the receiver side. Example embodiments of a method, here performed by the second device 122, for receiving data in a D2D transmission from the first device 121, will now be described with reference to a sequence diagram depicted in FIG. 4.

The method comprises the following action.

Action 401

The second device 122 may determine the type of e.g. service, resource allocation, group ID, release, priority level, etc. that it is interested into. In the example scenario, the first device 121 that had data to transmit to the second device 122 using D2D has sent the data according to Action 303 described above. The second device 122 determines a priority level of the D2D transmission.

Action 402

In the example scenario the second device 122 then maps the determined priority level to the resource pool index, which resource pool index identifies the resource pool among a plurality of resource pools associated with different priority levels.

The second device 122 may identifies the associated pool via the mapping and receives data on the identified associated pool as described below in action 403.

Action 403

Thus the second device 122 receives the data in the D2D transmission from the first device 121, using resources in a resource pool identified by the resource pool index. For example, the second device 122 may receive the data in the D2D transmission from the first device 121 on the resources in the resource pool identified by the resource pool index.

The priority level of the D2D transmission is mapped to the resource pool index. The resource pool index identifies a resource pool among a plurality of resource pools associated with different priority levels.

The priority level may e.g. be a function of characteristics of the D2D transmission, which characteristics comprise at least one of: a type of communication, a type of device such as type of the first device 121 and/or the second device 122, and a type of resource allocation.

The type of communication affecting priority level may be one or more of: an emergency type of communication, a commercial type of communication, a unicast type of communication, a multi-cast type of communication and a broadcast type of communication.

The type of resource allocation affecting priority level may further be one or more of: random source selection, CSMA-based resource selection, energy-sensing based resource selection and contention-resolution based resource selection.

The type of device may be one of different respective device releases of a Third Generation Partnership Project (3GPP) standard, such as LTE and LTE Proximity Services-related Services and Capabilities, and different resource pools out of the plurality of resource pools may be associated with the different respective device releases of the 3GPP standard, such as LTE and LTE Proximity Services-related Services and Capabilities, and associated with different respective resource pool indexes.

In some embodiments, the type of device may be the type of the receiving device, e.g. the second device 122. It is however also conceivable that the characteristics of the D2D transmission also comprises the type of the transmitting device, e.g. the first device 121.

The priority level may further be a function of other characteristics of the D2D transmission, which characteristics may comprise at least one of: a destination address of the D2D transmission, and properties of the destination address of the D2D transmission. Additionally or alternatively, the priority level may be application-based, i.e. it may be a function of the type of application generating the D2D transmission. In some embodiments, the application-based priority level may be assigned by the user.

In some embodiments, the priority level is a function of the transmission type such that different resource pools out of the plurality of resource pools are associated with different respective transmission types and associated with different respective resource pool indexes. Examples of transmission types are: SA, mode-2 data transmission, mode-2 SAs, type-1 discovery transmission/signals, all suggested to have specific resource pools above. These transmission types are used for forward/reverse link D2D transmission and further described in 3GPP TS 36.213.

In some embodiments, the plurality of resource pools may e.g. include an SA resource pool, a mode-2 data resource pool, a mode-2 SA resource pool and/or a type-1 discovery resource pool.

Embodiments herein will now be described and explained more in detail. The text below is applicable to and may be combined with any suitable embodiment described above. The first device 121 may be referred to a transmitter herein, and the second device 122 may be referred to a receiver herein.

Figure 5:
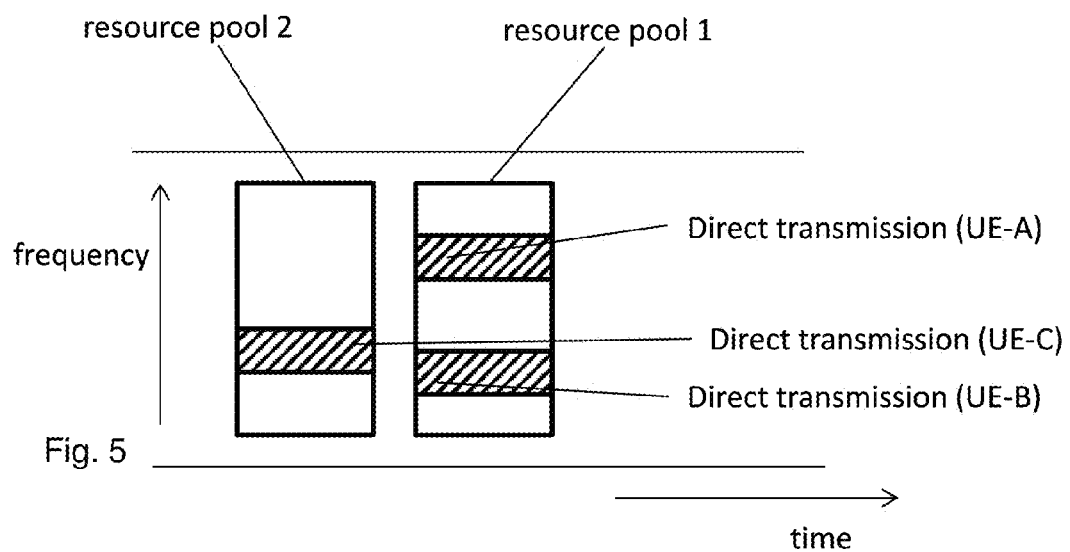
FIG. 5 is a diagram of resource pools according to embodiments herein.

FIG. 5 depicts a diagram of resource pools multiplexed in time. FIG. 5 shows that signals transmitted by two UEs, UE-A and UE-B are mapped to a first resource pool 1 and the signal from UE-C is mapped to a second resource pool 2. The resource pools are multiplexed in time and no collision occurs. UE-A, UE-B and UE-C in FIG. 5 are transmitters such as the first wireless device 121.

Figure 6:
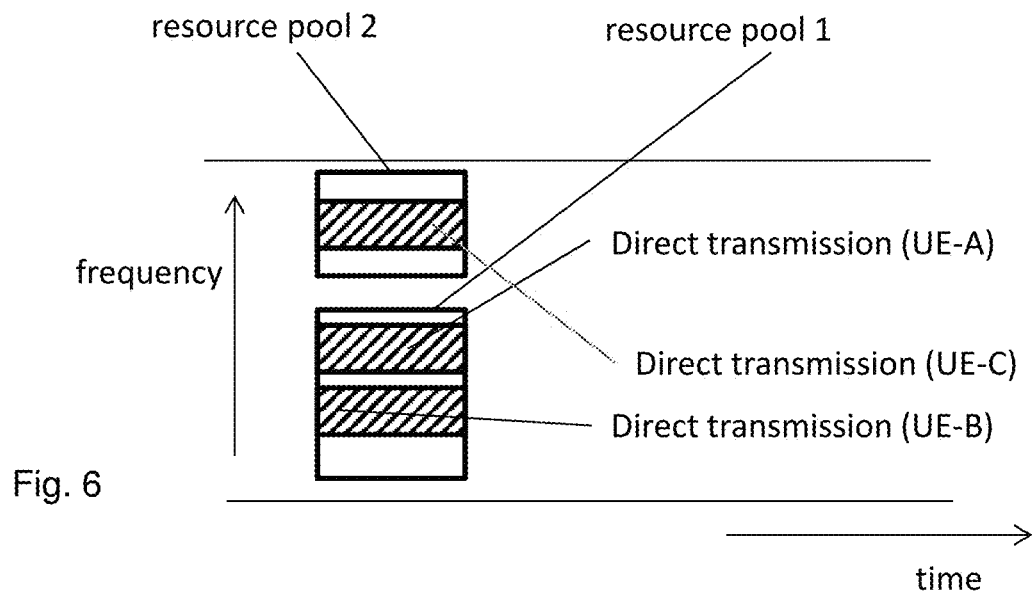
FIG. 6 is a diagram of resource pools according to embodiments herein.

FIG. 6 is a diagram of resource pools multiplexed in frequency. FIG. 6 shows that signals transmitted by UEs UE-A and UE-B are mapped to resource pool 1 and the signal from UE-C is mapped to resource pool 2. The resource pools are multiplexed in frequency and no collision occurs. UE-A, UE-B and UE-C in FIG. 6 are transmitters such as the first wireless device 121.

As mentioned above, embodiments herein include mapping D2D transmissions to certain resource pools based at least on some priority level for the associated transmission.

UE Properties.

For example, a priority level may be interpreted as a function of UE properties e.g. relating to the properties of the first device 121 and/or the second device 122, such as e.g. the type of the first device 121 and/or the type of the second device 122. In some embodiments the type of device may be referred to as UE type. The UE type may for example be Public Safety UE, commercial UE, Public Safety Officer UE, high power UE, etc.

The priority level may further be interpreted as a function of UE properties such as e.g. UE release and UE capabilities. In one particular embodiment, different resource pools are associated to different UE releases. For example, 3GPP Rel-12 LTE UEs may be mapped to pool 1, while 3GPP Rel-13 LTE UEs are mapped to pool 2.

D2D Transmission Characteristics.

Alternatively or additionally, priority level may be interpreted as a function of the D2D transmission characteristics. For example the priority level may be interpreted as a function of the type of communication of the D2D transmission. It may e.g. be an emergency communication, a commercial communication, a unicast communication, a multicast communication, a broadcast communication, etc.

The priority level may further be interpreted as a function of the D2D transmission characteristics such as properties of the destination address for the communication, the destination and/or source address of the transmission. The destination address may be a group address e.g. for a group of devices participating to a group communication type of transmission. The priority level may further be application-based priority level, including user-assigned priority level, etc.

D2D Resource Allocation Protocol/Algorithm.

Alternatively or additionally, the priority level may be interpreted as a function of the D2D resource allocation protocol/algorithm, such as random resource selection, CSMA-based resource selection, energy-sensing based resource selection, contention-resolution based resource selection, etc.

The mapping from the D2D transmissions to specific pool(s) based on the priority level/priorities listed above may be pre-defined or assigned by the NW and/or applications in any way. Example mappings are provided in FIG. 5 and FIG. 6 above.

The priority levels associated with the pools may be signaled from the network such as the network node 130 to the transmitters such as the first device 121 and/or the receivers such as the second device 122, or they may be pre-configured in the first and second devices.

When a transmission is mapped to a certain pool or set of pools, the transmitter such as the first device 121 selects the D2D transmission resources within the pool(s) based on any access algorithm, including random resource selection algorithm, contention avoidance-based selection algorithm, etc.

In some embodiments, a receiver such as the second device 122 prioritizes reception of certain D2D signals with respect to others based at least on the priority index of the resource pools for D2D. The prioritization rules at the receiver may be pre-defined, signaled by the network such as the network node 130, or be specified in a specification, such as a standard specification.

Some example embodiments may comprise the following actions:

Multiple resource pools that need to be monitored jointly may be defined e.g. by the network node 130 and allocated for the D2D transmission. The definition and/or allocation may for example be performed by the network node 130.

Rules may be associated to different priority levels, such that a receiver such as the second device 122 may prioritize monitoring of certain pools against other reception resources, e.g. including other pools. For example, the receiver such as the second device 122 may prioritize monitoring of certain pools over monitoring of other reception resources, or vice versa.

Rules may be defined for accessing the different pools in case of transmission, where at least some priority-related parameters may be taken into account in the selection of the available pool(s) for transmission of a certain signal.

Alternatively or complementarily, rules may be defined for accessing the different pools in case of transmission, where at least some UE capabilities-related parameter, e.g. including the release of the device, is taken into account in the selection of the available pool(s) for transmission of a certain signal.

Figure 7:
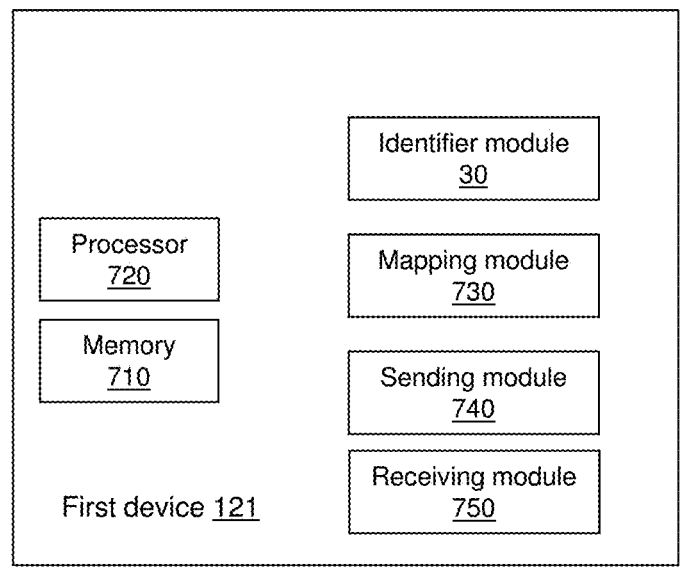
FIG. 7 is a schematic block diagram illustrating embodiments of a first device.

To perform the method actions for sending or transmitting data in a D2D transmission to the second device 122 described above in relation to FIG. 3, the first device 121 may comprise the following arrangement depicted in FIG. 7.

The first device 121 may comprise a memory 710 such as the memory module 22 described below. The memory 710 may be configured to store a priority level or different priority levels, and an index such as the resource pool index. In some embodiments, the memory 710 is configured to store information about resource pool indexes identifying each respective resource pool comprised in the plurality of resource pools associated with different priority levels. The first device 121 comprises a processor 720 such as the processor 24 described below.

The processor 720 is configured to, e.g. by means of an identifier module 30 being configured to, identify a priority level of the D2D transmission.

The processor 720 is further configured to e.g. by means of a mapping module 730 or a resource pool selector 32 being configured to, map the identified priority level to a resource pool index. The resource pool index identifies a resource pool among a plurality of resource pools associated with different priority levels.

The processor 720 is further configured to e.g. by means of a sending module 740 or a resource pool selector 32 being configured to, send or transmit the data in the D2D transmission to the second device 122, using the resources in the resource pool identified by the resource pool index. For example, the processor 720 may be configured to, e.g. by means of the sending module 740 or a resource pool selector 32 being configured to, send or transmit the data in the D2D transmission to the second device 122, on the resources in the resource pool identified by the resource pool index.

The priority level may be a function of characteristics of the D2D transmission. The characteristics may comprise at least one of: a type of communication, a type of device, and a type of resource allocation.

The type of communication affecting priority level may be one or more of: an emergency type of communication, a commercial type of communication, a unicast type of communication, a multi-cast type of communication and a broadcast type of communication.

The type of resource allocation affecting priority level may be one or more of: random source selection, CSMA-based resource selection, energy-sensing based resource selection and contention-resolution based resource selection.

The type of device may be one of different respective device releases of a Third Generation Partnership Project (3GPP) standard, such as LTE and LTE Proximity Services-related Services and Capabilities, and different resource pools out of the plurality of resource pools may be associated with the different respective device releases of the 3GPP standard and associated with different respective resource pool indexes.

In some embodiments the priority level may further be a function of other characteristics of the D2D transmission, which characteristics may comprise at least one of: a destination address of the D2D transmission, properties of the destination address of the D2D transmission and a type of application. The type of application may be the type of the application generating the D2D transmission.

In some embodiments, the priority level may be a function of the transmission type such that different resource pools out of the plurality of resource pools are associated with different respective transmission types and associated with different respective resource pool indexes.

In some embodiments, the plurality of resource pools may comprise an SA resource pool, a mode-2 data resource pool, a mode-2 SA resource pool and/or a type-1 discovery resource pool.

In some embodiments, the first device 121 may further be configured to, e.g. by means of a receiving module 750 being configured to, receive information about resource pool indexes identifying each respective resource pool comprised in the plurality of resource pools associated with different priority levels from a network node 130.

Figure 9:
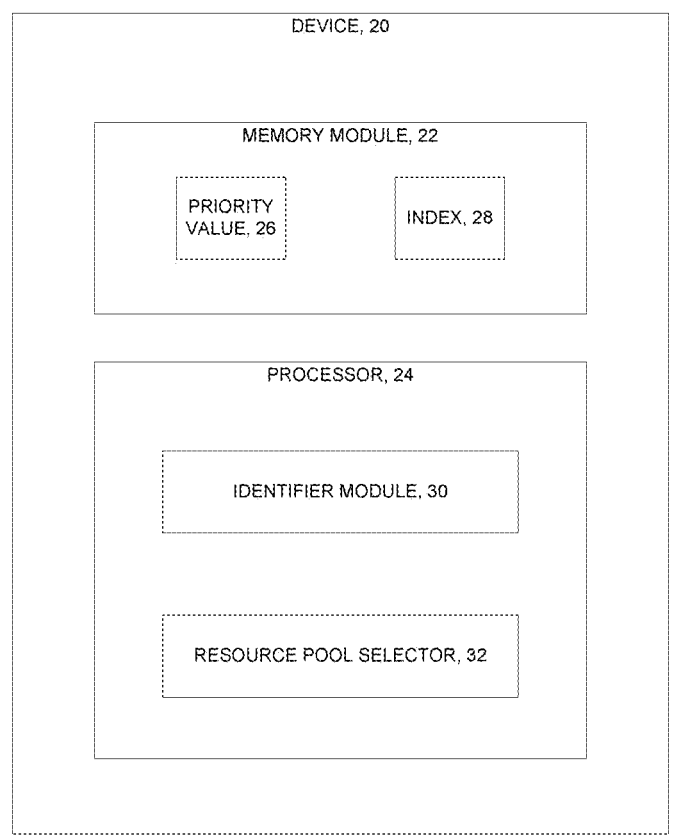
FIG. 9 is a schematic block diagram depicting embodiments of a device.

The embodiments herein comprising the process of sending or transmitting data in a D2D transmission to a second device 122 may be implemented through one or more processors, such as the processor 720 in the first device 121 depicted in FIG. 7 or the processor 24 in an alternative representation of the first device 121, depicted as device 20 in FIG. 9, together with computer program code for performing the functions and actions of the embodiments herein. The program code mentioned above may also be provided as a computer program product, for instance in the form of a data carrier carrying computer program code for performing the embodiments herein when being loaded into the first device 121. One such carrier may be in the form of a Compact Disk Read Only Memory (CD ROM) disc. It is however feasible with other data carriers such as a memory stick. The computer program code may furthermore be provided as program code on a server and downloaded to the first device 121.

The memory 710 of the first device 121 may further comprise one or more memory units such as e.g. the memory module 22 depicted in FIG. 9. The memory 710 comprises instructions executable by the processor 720.

The memory 710 is arranged to be used to store e.g. priority levels related to indices, data, configurations, and applications to perform the methods herein when being executed, i.e. when being run, by the processor 720 in the first device 121.

Those skilled in the art will also appreciate that the identifier module 30, the mapping module 730 and the sending module 740, receiving module 750, described above may refer to a combination of analog and digital circuits, and/or one or more processors configured with software and/or firmware, e.g. stored in the memory 710, that when executed by the one or more processors such as the processor 720 in the first device 121, the method actions are performed as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 8:
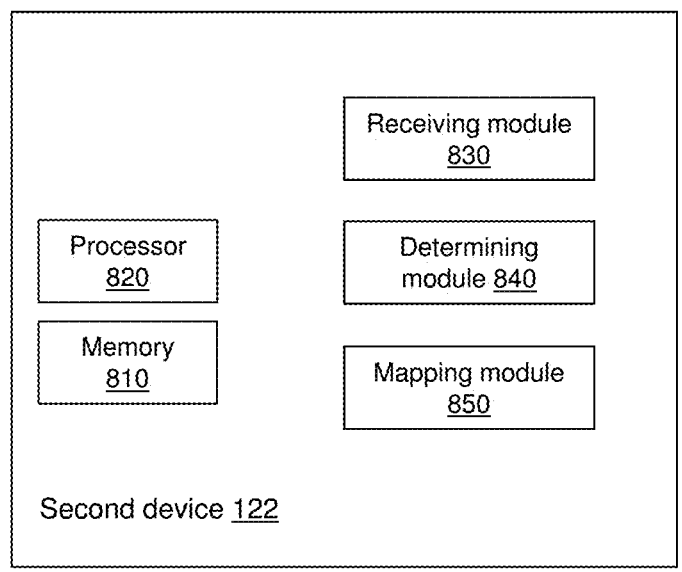
FIG. 8 is a schematic block diagram illustrating embodiments of a second device.

To perform the method actions for receiving data in a D2D transmission from the first device 121, described above in relation to FIG. 4, the second device 122 may comprise the following arrangement as depicted in FIG. 8.

The second device 122 comprises a memory 810 such as the memory module 22 described below. The memory 810 may be configured to store a priority level such as different priority levels and an index such as a resource pool index. The memory 810 may e.g. be configured to store information about resource pool indexes identifying each respective resource pool comprised in the plurality of resource pools associated with different priority levels? The second device 122 comprises a processor 820 such as the processor 24 described below.

The processor 820 is configured to, e.g. by means of a receiving module 830 being configured to, receive the data in the D2D transmission from the first device 121, using resources in a resource pool identified by a resource pool index. For example, the processor 820 may be configured to, e.g. by means of the receiving module 830 being configured to, receive the data in the D2D transmission from the first device 121, on the resources in the resource pool identified by the resource pool index.

The priority level of the D2D transmission is mapped to the resource pool index, which resource pool index identifies a resource pool among a plurality of resource pools associated with different priority levels.

In some embodiments, the priority level may be a function of characteristics of the D2D transmission. The characteristics may comprise at least one of: a type of communication, a type of device, and a type of resource allocation.

The type of communication affecting priority level may be one or more of: an emergency type of communication, a commercial type of communication, a unicast type of communication, a multi-cast type of communication and a broadcast type of communication.

The type of resource allocation affecting the priority level may be one or more of: random source selection, CSMA-based resource selection, energy-sensing based resource selection and contention-resolution based resource selection.

The type of device may be one of different respective device releases of a Third Generation Partnership Project (3GPP) standard, such as LTE and LTE Proximity Services-related Services and Capabilities, and different resource pools out of the plurality of resource pools may be associated with the different respective device releases of the 3GPP standard and associated with different respective resource pool indexes.

The priority level may further be a function of other characteristics of the D2D transmission, which characteristics may comprise at least one of: a destination address of the D2D transmission, properties of the destination address of the D2D transmission and a type of application. The type of application may be the type of the application generating the D2D transmission.

In some embodiments, the priority level may be a function of the transmission type such that different resource pools out of the plurality of resource pools are associated with different respective transmission types and associated with different respective resource pool indexes.

In some embodiments, the plurality of resource pools may include an SA resource pool, a mode-2 data resource pool, a mode-2 SA resource pool and/or a type-1 discovery resource pool.

The second device 122 may further be configured to, e.g. e.g. by means of a determining module 840 being configured to, determine a priority level of the D2D transmission.

The second device 122 may further be configured to, e.g. e.g. by means of a mapping module 850 being configured to, map the determined priority level to the resource pool index, which resource pool index identifies the resource pool among a plurality of resource pools associated with different priority levels.

The embodiments herein comprising the process of receiving data in a D2D transmission from the first device 121, may be implemented through one or more processors, such as the processor 820 in the second device 122 depicted in FIG. 8 or the processor 24 in an alternative representation of the second device 122, depicted as device 20 in FIG. 9, together with computer program code for performing the functions and actions of the embodiments herein. The program code mentioned above may also be provided as a computer program product, for instance in the form of a data carrier carrying computer program code for performing the embodiments herein when being loaded into the second device 122. One such carrier may be in the form of a CD ROM disc. It is however feasible with other data carriers such as a memory stick. The computer program code may furthermore be provided as program code on a server and downloaded to the second device 122.

The memory 810 of the second device 122 may further comprise one or more memory units, such as such as e.g. the memory module 22, depicted in FIG. 9. The memory 810 comprises instructions executable by the processor 820.

Those skilled in the art will also appreciate that the modules in the second device 122 described above may refer to a combination of analog and digital circuits, and/or one or more processors configured with software and/or firmware, e.g. stored in the memory 810, that when executed by the one or more processors such as the processor 820 in the second device 122, the method actions are performed as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

FIG. 9 is a block diagram of an exemplary wireless device 20 capable of D2D communication. The wireless device 20 may be any one or more out of the first device 121 and the second device 122. The wireless device 20 is constructed in accordance with principles of some embodiments herein. The wireless device 20 may comprise the memory module 22 and a processor 24. The memory module 22 stores one or more priority level values 26 and one or more indices 28, where each index, also denoted resource pool index herein, corresponds to a different resource pool. The processor 24 includes an identifier module 30 configured to identify a plurality of resource pools. A resource pool selector module 32 is configured to select a resource pool associated with an index 28 based on a stored priority level value 26. The device 22 such as the first or second device 121, 122 may in some embodiments be a base station.

Figure 10:
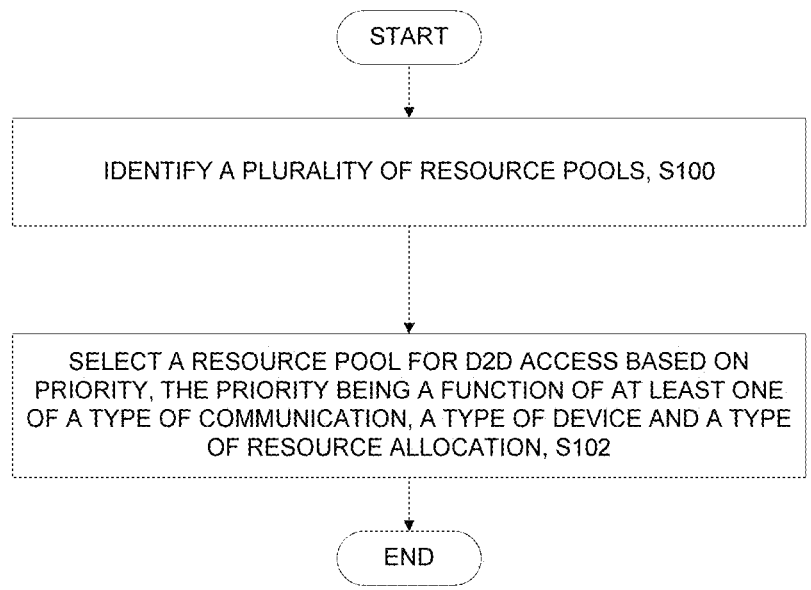
FIG. 10 is a flowchart depicting embodiments of a method in a device.

FIG. 10 is a flow chart of an exemplary process for identifying and selecting a resource pool for D2D communication by a device such as the device 20 shown in FIG. 9. The process includes identifying a plurality of resource pools, block S100. A resource pool is selected for D2D access based on a priority level, block S102. The priority level may be a function of at least one of a type of communication, a type of device and a type of resource allocation.

Some exemplary embodiments may be described according to the following: A method and system for allocating resources to a device capable of D2D communication is provided. According to one aspect, a method includes identifying a plurality of resource pools. The method further includes selecting a resource pool for D2D access based on a priority level, the priority level being a function of at least one of a type of communication, a type of the device, and a type of resource allocation.

According to this aspect, in some embodiments, the type of device affecting priority level is one of a PS UE, commercial UE, office UE and a high power UE. In some embodiments, the type of communication affecting priority level is one of emergency, commercial, unicast, multi-cast and broadcast. In some embodiments, the type of resource allocation affecting priority level is one of random resource selection, CSMA-based resource selection, energy-sensing based resource selection and contention-resolution based resource selection. In some embodiments, the different resource pools include an SA resource pool, a mode-2 data resource pool, a mode-2 SA resource pool and a type-1 discovery resource pool. In some embodiments, a priority level associated with a resource pool is signaled to the device from a network node. In some embodiments, a resource pool is selected based on a whether the UE is one of a 3GPP Rel-12 and Rel-13 device.

According to another aspect, embodiments include a device capable of device-to-device, D2D, communication. The device has a memory configured to store a priority level and an index. The device also has a processor. The processor is configured to identify a plurality of resource pools. The processor is also configured to select a resource pool associated with the index based on a stored priority level, the priority level being a function of at least one of a type of communication, a type of the device, and a type of resource allocation.

According to this aspect, in some embodiments, the type of device affecting priority level is one of a PS UE, commercial UE, office UE and a high power UE. In some embodiments, the type of communication affecting priority level is one of emergency, commercial, unicast, multi-cast and broadcast. In some embodiments, the type of resource allocation affecting priority level is one of random resource selection, CSMA-based resource selection, energy-sensing based resource selection and contention-resolution based resource selection.

According to yet another aspect, embodiments include a device capable of device-to-device, D2D, communication. The device includes a memory module configured to store a priority level and an index. The device also includes an identifier module configured to identify a plurality of resource pools. The device further includes a resource pool selector configured to select a resource pool associated with the index based on a stored priority level, the priority level being a function of at least one of a type of communication, a type of the device, and a type of resource allocation.

According to this aspect, in some embodiments, the type of device affecting priority level is one of a PS UE, commercial UE, office UE and a high power UE. In some embodiments, the type of communication affecting priority level is one of emergency, commercial, unicast, multi-cast and broadcast. In some embodiments, the type of resource allocation affecting priority level is one of random source selection, CSMA-based resource selection, energy-sensing based resource selection and contention-resolution based resource selection.

Embodiments herein may be realized in hardware, or a combination of hardware and software. Any kind of computing system, or other apparatus adapted for carrying out the methods described herein, is suited to perform the functions described herein. A typical combination of hardware and software may be a specialized computer system, having one or more processing elements and a computer program stored on a storage medium that, when loaded and executed, controls the computer system such that it carries out the methods described herein. Embodiments herein may also be embedded in a computer program product, which comprises all the features enabling the implementation of the methods described herein, and which, when loaded in a computing system is able to carry out these methods. Storage medium may refer to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings.

The invention claimed is:

1. A method performed by a first device, for sending data in a Device-to-Device, D2D, transmission to a second device, the method comprising:

identifying a priority level of the D2D transmission, the priority level being a function of whether a communication is one of an emergency type of communication and a commercial type of communication and further being a function of characteristics of the D2D transmission, which characteristics comprise at least a type of resource allocation, the type of resource allocation being one of a random resource selection, Carrier Sense Multiple Access, CSMA,-based resource selection, energy-sensing based resource selection and contention-resolution based resource selection;

mapping the identified priority level to a resource pool index, which resource pool index identifies a resource pool among a plurality of resource pools associated with different priority levels, each resource pool of the plurality of resource pools being one of a Scheduling Assignment, SA, resource pool, a mode-2 data resource pool, and a mode-2 SA resource pool; and sending the data in the D2D transmission to the second device using the resources in the resource pool identified by the resource pool index.

2. The method of claim 1, wherein the characteristics further comprise at least one of: a type of communication, and a type of device.

3. The method of claim 2, wherein the type of communication is one of: an emergency type of communication, a commercial type of communication, a unicast type of communication, a multi-cast type of communication and a broadcast type of communication.

4. The method of claim 1, wherein the priority level is a function of characteristics of the D2D transmission, which characteristics comprise at least one of: a destination address of the D2D transmission and properties of the destination address of the D2D transmission.

5. The method of claim 1, wherein the priority level is a function of the transmission type such that different resource pools out of the plurality of resource pools are associated with different respective transmission types and associated with different respective resource pool indexes.

6. The method of any of claim 1, wherein information about resource pool indexes identifying each respective resource pool comprised in the plurality of resource pools associated with different priority levels is signaled to the first device from a network node.

7. A method performed by a second device, for receiving data in a Device-to-Device, D2D, transmission from a first device, the method comprising:

receiving the data in the D2D transmission from the first device, using resources in a resource pool identified by a resource pool index; and a priority level of the D2D transmission being mapped to the resource pool index, which resource pool index identifies a resource pool among a plurality of resource pools associated with different priority levels, the priority level being a function of whether a communication is one of an emergency type of communication and a commercial type of communication and further being a function of characteristics of the D2D transmission, which characteristics comprise at least a type of resource allocation, each resource pool of the plurality of resource pools being one of a Scheduling Assignment, SA, resource pool, a mode-2 data resource pool, and a mode-2 SA resource pool, the type of resource allocation being one of a random resource selection, Carrier Sense Multiple Access, CSMA,-based resource selection, energy-sensing based resource selection and contention-resolution based resource selection.

8. The method of claim 7, wherein the characteristics further comprise at least one of: a type of communication, and a type of device.

9. The method of claim 8, wherein the type of communication is one of: an emergency type of communication, a commercial type of communication, a unicast type of communication, a multi-cast type of communication and a broadcast type of communication.

10. The method of claim 7, wherein the priority level is a function of characteristics of the D2D transmission, which characteristics comprise at least one of: a destination address of the D2D transmission and properties of the destination address of the D2D transmission.

11. The method of claim 7, wherein the priority level is a function of the transmission type such that different resource pools out of the plurality of resource pools are associated with different respective transmission types and associated with different respective resource pool indexes.

12. A first device for sending data in a Device-to-Device, D2D, transmission to a second device, the first device comprising:

a processor and a memory, the memory storing instructions to configure the processor to:

identify a priority level of the D2D transmission, the priority level being a function of whether a communication is one of an emergency type of communication and a commercial type of communication and further being a function of characteristics of the D2D transmission, which characteristics comprise at least a type of resource allocation, the type of resource allocation being one of a random resource selection, Carrier Sense Multiple Access, CSMA,-based resource selection, energy-sensing based resource selection and contention-resolution based resource selection;

map the identified priority level to a resource pool index, which resource pool index identifies a resource pool among a plurality of resource pools associated with different priority levels, each resource pool of the plurality of resource pools being one of a Scheduling Assignment, SA, resource pool, a mode-2 data resource pool, and a mode-2 SA resource pool; and send the data in the D2D transmission to the second device using the resources in the resource pool identified by the resource pool index.

13. The first device of claim 12, wherein the characteristics further comprise at least one of: a type of communication, and a type of device.

14. The first device of claim 13, wherein the type of communication is one of: an emergency type of communication, a commercial type of communication, a unicast type of communication, a multi-cast type of communication and a broadcast type of communication.

15. The first device of claim 12, wherein the priority level is a function of characteristics of the D2D transmission, which characteristics comprise at least one of: a destination address of the D2D transmission and properties of the destination address of the D2D transmission.

16. The first device of claim 12, wherein the priority level is a function of the transmission type such that different resource pools out of the plurality of resource pools are associated with different respective transmission types and associated with different respective resource pool indexes.

17. A second device, for receiving data in a Device-to-Device, D2D, transmission from a first device, the second device comprising:

a processor and a memory, the memory storing instructions to configure the processor to:
receive the data in the D2D transmission from the first device, using resources in a resource pool identified by a resource pool index; and
a priority level of the D2D transmission being mapped to the resource pool index, which resource pool index identifies a resource pool among a plurality of resource pools associated with different priority levels, the priority level being a function of whether a communication is one of an emergency type of communication and a commercial type of communication and further being a function of characteristics of the D2D transmission, which characteristics comprise at least a type of resource allocation, each resource pool of the plurality of resource pools being one of a Scheduling Assignment, SA, resource pool, a mode-2 data resource pool, and a mode-2 SA resource pool, the type of resource allocation being one of a random resource selection, Carrier Sense Multiple Access, CSMA,-based resource selection, energy-sensing based resource selection and contention-resolution based resource selection.

18. The second device of claim 17, wherein the characteristics further comprise at least one of: a type of communication, and a type of device.

19. The second device of claim 18, wherein the type of communication is one of: an emergency type of communication, a commercial type of communication, a unicast type of communication, a multi-cast type of communication and a broadcast type of communication.

20. The second device of claim 17, wherein the priority level is a function of characteristics of the D2D transmission, which characteristics comprise at least one of: a destination address of the D2D transmission and properties of the destination address of the D2D transmission.

21. The second device of claim 17, wherein the priority level is a function of the transmission type such that different resource pools out of the plurality of resource pools are associated with different respective transmission types and associated with different respective resource pool indexes.

* * * * *